3,139,456
N-(SUBSTITUTED PHENOXYALKYL)-ARALKYLAMINES

Robert C. Tweit, Wilmette, Ill., assignor to G. D. Searle & Co., Chicago, Ill., a corporation of Delaware
No Drawing. Filed July 27, 1960, Ser. No. 45,559
11 Claims. (Cl. 260—570.7)

The present invention relates to N-(substituted phenoxyalkyl)aralkylamines of the formula

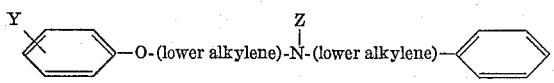

wherein Y represents a nitro or amino group, and Z is hydrogen or lower alkyl. Among the lower alkyl radicals represented by Z are methyl, ethyl, propyl, isopropyl, butyl, isobutyl, sec-butyl, tert-butyl, pentyl, isopentyl, tert-pentyl, neopentyl, hexyl, isohexyl, heptyl and octyl. Equivalent to the foregoing compounds for purposes of the present invention are non-toxic acid addition salts thereof, the composition of which is depicted by

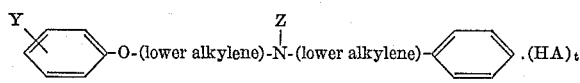

wherein Y and Z have the meanings hereinbefore assigned; A is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartarate, citrate, gluconate, ascorbate, benzoate, cinnamate, or the like—which, in combination with the cationic portion of a salt aforesaid, is neither pharmacologically or otherwise undesirable in physiological dosage; $t$ is either 1 or 2.

The compounds to which this invention relates are useful because of their valuable pharmacological properties. Thus, for example, they inhibit appetite; inhibit the growth of *Tricshophyton mentagrophytes*; and counteract the heat, swelling, redness, and granuloma formation characteristic of the inflammatory response to tissue injury.

Manufacture of the subject compounds is accomplished by alkylation of an aralkylamine with a substituted phenoxyalkyl halide. The resultant product may be further modified, when a nitro group is present, by catalytic reduction to furnish the corresponding amino compound.

Conversion of the amine bases of this invention to the corresponding acid addition salts is accomplished by simple admixture of these compounds with 1 or 2 equivalents of any of various inorganic and strong organic acids, the anionic portion of which conforms to A as hereinabove defined.

The following examples describe in detail certain of the compounds illustrative of the present invention and methods which have been devised for their manufacture. However, the invention is not to be construed as limited thereby, either in spirit or scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight except as otherwise noted.

Example 1

N - [2 - (*p-nitrophenoxy*)*ethyl*]*benzylamine hydrochloride*.—A mixture of 25 parts of 2-(p-niitrophenoxy)ethyl bromide, 11 parts of benzylamine, 240 parts of 95% of ethanol and 12 parts of sodium carbonate is heated under reflux for about 24 hours, and then the resultant reaction mixture is diluted with 550 parts of water. The mixture thus obtained is extracted twice with ether, and the ethereal extracts are dried over anhydrous sodium carbonate. To the resultant solution is added a saturated solution of hydrogen chloride gas in isopropyl alcohol; the precipitate which forms is removed by filtration to give N-[2-(p-nitrophenoxy)ethyl]benzylamine hydrochloride, melting at 204–206°. The structure may be expressed as

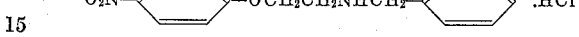

Example 2

N - [2 - (*p-aminophenoxy*)*ethyl*]*benzylamine dihydrochloride*.—A mixture of 100 parts of N-[2-(p-nitrophenoxy)ethyl]benzylamine hydrochloride, 2000 parts of acetic acid and 10 parts of 5% palladium-on-charcoal is treated with hydrogen at about 60 pounds per square inch at room temperature until the theoretical quantity of hydrogen is taken up. The catalyst is removed by filtration, and the filtrate is cooled. The resultant precipitate is removed by filtration to give N-[2-(p-aminophenoxy)-ethyl]benzylamine dihydrochloride, melting at 245–248°. The structure may be expressed as

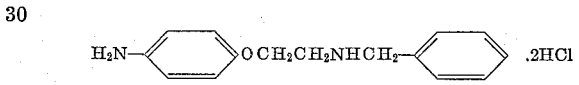

Example 3

N-[2-(*o-nitrophenoxy*)*ethyl*]-3-*phenylpropylamine hydrochloride*.—Substitution of 25 parts of 2-(o-nitrophenoxy)ethyl bromide for the 2-(p-nitrophenoxy)ethyl bromide and 14 parts of 3-phenylpropylamine for the benzylamine of Example 1 gives, by the procedure therein detailed, N-[2-(o-nitrophenoxy)ethyl]-3-phenylpropylamine hydrochloride. The salt is recrystallized from ethanol-ether, and the material thus purified melts at about 129–130°.

Example 4

N-[2-(*o-aminophenoxy*)*ethyl*] - 3 - *phenylpropylamine hydrochloride*.—Substitution of 110 parts of N-[2-(o-nitrophenoxy)ethyl]-3-phenylpropylamine hydrochloride for the N-[2-(p-nitrophenoxy)ethyl]benzylamine hydrochloride of Example 2 gives, by the procedure therein detailed, N-[2-(o-aminophenoxy)ethyl] - 3 - phenylpropylamine hydrochloride, melting at 216–218°.

Example 5 d-2' - (*p-nitrophenoxy*)-1-*methyl*-2-*phenyldiethylamine maleate*.—Substitution of 14 parts of d-1-methyl-2-phenylethylamine for the benzylamine of Example 1 gives, by the procedure therein detailed, d-2'-(p-nitrophenoxy)-1-methyl-2-phenyldiethylamine in ether solution; the solution thus obtained is extracted with water, and the organic layer is dried over anhydrous sodium carbonate. To the solution thus obtained is added a solution of 5 parts of maleic acid in a minimum of methanol, whereupon a precipitate forms. The solid material thus obtained is removed by filtration, and recrystallized from methanol to give d-2'-(p-nitrophenoxy)-1-methyl - 2 - phenyldiethylamine maleate, melting at 151–154°.

Example 6 d-2'-(*p-aminophenoxy*)-1-*methyl* - 2 - *phenyldiethyl*-

*amine maleate*.—Substitution of 133 parts of d-2'-(p-nitrophenoxy)-1-methyl-2-phenyldiethylamine maleate for the N-[2-(p-nitrophenoxy)ethyl]benzylamine hydrochloride of Example 2 gives, by the procedure therein detailed, d-2'-(p-aminophenoxy)-1-methyl - 2 - phenyldiethylamine succinate in acetic acid solution. The solvent is removed under vacuum, and the residue is taken up in water. The resultant aqueous solution is made basic with aqueous sodium hydroxide, and then extracted with ether. The ether layer is dried over anhydrous sodium carbonate, and to the solution thus obtained is added a solution of 15 parts of maleic acid in a minmum of methanol. The precipitate which forms is removed by filtration, and recrystallized from acetone-methanol-ether to give d-2'-(p-aminophenoxy)-1-methyl-2-phenyldiethylamine maleate, melting at 149–153°.

*Example 7*

*N-[2-(p-nitrophenoxy)ethyl] - N - methylbenzylamine hydrochloride*.—Substitution of 12 parts of N-methylbenzylamine for the benzylamine of Example 1 gives, by the procedure therein detailed, N-[2-(p-nitrophenoxy)ethyl]-N-methylbenzylhydrochloride, melting at 176–178°.

*Example 8*

*N-[2-(p-nitrophenoxy)ethyl]-N-ethylbenzylamine hydrochloride*.—Substitution of 13 parts of N-ethylbenzylamine for the benzylamine of Example 1 gives, by the procedure therein detailed, N-[2-(p-nitrophenoxy)ethyl]-N-ethylbenzylamine hydrochloride.

*Example 9*

*N-(1-methyl-2-phenylethyl) - 3 - (p-nitrophenoxy)propylamine hydrochloride*.—Substitution of 26 parts of 3-(p-nitrophenoxy)propyl bromide for the 2-(p-nitrophenoxy)ethyl bromide and 18 parts of 1-methyl-2-phenylethylamine for the benzylamine of Example 1 gives, by the procedure therein detailed, N-(1-methyl-2-phenylethyl)-3-(p-nitrophenoxy)propylamine hydrochloride; the sample purified by recrystallization from methanol melts at about 164–165°.

What is claimed is:
1. A compound of the formula

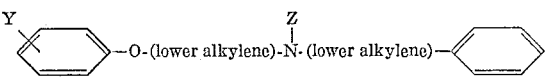

wherein Y is a member of the class consisting of nitro and amino, and Z is a member of the class consisting of hydrogen and lower alkyl.

2. N-[2-(p-nitrophenoxy)ethyl] - N - methylbenzylamine.
3. A compound of the formula

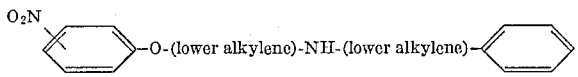

4. N-[2-(p-nitrophenoxy)ethyl]benzylamine.
5. d-2'-(p-nitrophenoxy) - 1 - methyl-2-phenyldiethylamine.
6. N-(1-methyl-2-phenylethyl) - 3 - (p-nitrophenoxy)propylamine.
7. N-[2 - (o-nitrophenoxy)ethyl] - 3 - phenylpropylamine.
8. A compound of the formula

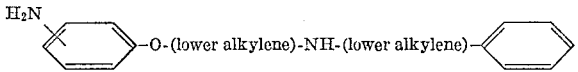

9. N-[2-(p-aminophenoxy)ethyl]benzylamine.
10. d-2'-(p-aminophenoxy) - 1 - methyl-2-phenyldiethylamine.
11. N-[2-(o-aminophenoxy)ethyl] - 3 - phenylpropylamine.

References Cited in the file of this patent
UNITED STATES PATENTS

| | | |
|---|---|---|
| 2,599,000 | Kerwin et al. | June 3, 1952 |
| 2,683,719 | Kerwin et al. | June 13, 1954 |
| 3,056,836 | Moed | Oct. 2, 1962 |

FOREIGN PATENTS

| | | |
|---|---|---|
| 212,209 | Australia | Jan. 24, 1958 |